United States Patent [19]
Poffenberger

[11] 3,800,397
[45] Apr. 2, 1974

[54] METHOD FOR MAKING APPLIANCE FOR LINEAR BODIES

[75] Inventor: James C. Poffenberger, Cleveland Heights, Ohio

[73] Assignee: Preformed Line Products Company, Cleveland, Ohio

[22] Filed: July 3, 1972

[21] Appl. No.: 268,627

Related U.S. Application Data
[62] Division of Ser. No. 190,351, Oct. 18, 1971, abandoned.

[52] U.S. Cl............... 29/416, 29/412, 113/116 HH
[51] Int. Cl............................................. B23p 17/00
[58] Field of Search........ 29/416, 417, 412; 287/75; 174/DIG. 12, 79, 173; 248/63; 113/116 W, 116 Y, 116 HH; 24/123 C, 129 B, 131 C; 57/144, 145, 161

[56] References Cited
UNITED STATES PATENTS
2,912,816  11/1959  Kitselman............................. 57/145
3,355,542  11/1967  Finn................................. 57/145 X
3,633,252  1/1972  Williams............................ 24/123 C FOREIGN PATENTS OR APPLICATIONS
394,169  6/1933  Great Britain....................... 29/416

Primary Examiner—Charles W. Lanham
Assistant Examiner—V. A. Dipalma
Attorney, Agent, or Firm—Gerald D. Hosier

[57] ABSTRACT

A method of making a helical appliance comprises forming continuous strips of resilient material into continuous helices and cutting the helices at spaced intervals to form helical legs. Other continuous strips are formed into continuous generally sine wave undulations and then cut between undulations to define generally U-shaped bights. A helical leg is then joined to each end of the bight to form the appliance. Other features are disclosed.

2 Claims, 4 Drawing Figures

METHOD FOR MAKING APPLIANCE FOR LINEAR BODIES

CROSS-REFERENCE TO RELATED APPLICATION

This application is a division of application Ser. No. 190,351, filed Oct. 18, 1971, now abandoned.

INTRODUCTION

The present invention relates generally to appliances for linear bodies and, more specifically, is directed to a new and improved method for making a helically preformed appliance. The present invention is of particular utility in the manufacture of devices of the type disclosed and claimed in the above-identified parent application and accordingly will be described in that context.

SUMMARY OF THE INVENTION

It is an objective of the present invention to provide a new and improved method for making helically preformed appliances. The method is particularly suited to manufacture of appliances wherein the two leg portions are of an unequal pitch length and provides a means for making such appliances on a continuous production basis.

The invention is directed to a method of manufacturing helical appliances of a type comprising a pair of helically preformed leg portions and a U-shaped bight portion joining the leg portions. Specifically, the method comprises the steps of: (1) forming continuous strips of resilient material into continuous helical strips of predetermined internal diameter and pitch length; (2) cutting said continuous helical strips at periodic intervals corresponding to the desired length of said helical legs; (3) forming continuous strips of resilient material into continuous generally sine wave type undulations, each individual undulation corresponding to the desired configuration of the bight portions of the appliances; (4) cutting said continuous undulating strips between each undulation to define generally U-shaped appliance bight portions; and integrally joining one of said helical legs to each end of each of said bight portions to form said helical appliances.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
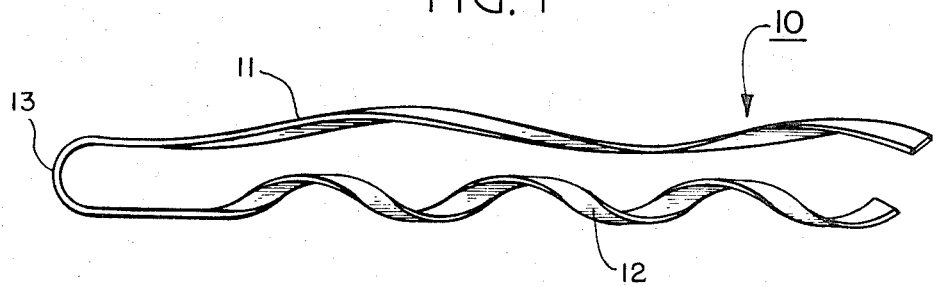
FIG. 1 is a side elevational view of a first embodiment of the present invention wherein the helical legs are of a like hand of lay.

Referring now to FIG. 1, the helically preformed appliance 10 there illustrated comprises a first elongated leg portion 11 helically preformed to a first predetermined pitch length. A second elongated leg portion 12 of the appliance is helically preformed to a second predetermined pitch length different from that of the first leg 11. In the present embodiment, the helical leg 11 is of a pitch length approximately twice that of the helical leg 12. The structure is completed by a return bent portion 13 which is integral with and joins the first and second legs 11 and 12.

As shown, the appliance 10 is composed of a single element in the form of a flat ribbon or strip of material, such as steel. It will be recognized by those skilled in the art that the device may be fabricated from other materials. It will further be recognized by those skilled in the art that the various prior art teachings with respect to manufacture of helically preformed appliances may readily be applied to effect various modifications of the illustrated appliance 10 and, indeed, such is contemplated by the present invention. For example, a knurling or gritting of those surfaces of appliance 10 that are adapted to engage the cable may be used to effectively enhance the gripping action of the device, as is disclosed and claimed in Patent 3,183,658-Peterson, assigned to the same assignee as the present invention. Additionally, by way of example, the appliance 10 may, in lieu of a flat strip of steel, be comprised of a single plastic rod or an appropriate grouping of rods such as disclosed and claimed in U.S. Pat. No. 2,761,273-Peterson and assigned to the same assignee as the present invention.

Figure 2:
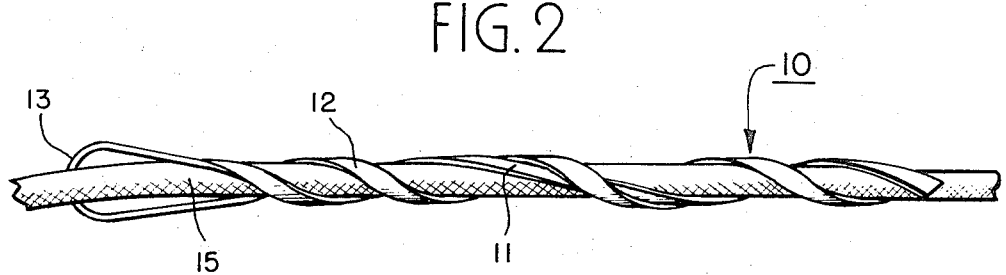
FIG. 2 illustrates the appliance of FIG. 1 as applied to a cable in providing a dead-end support therefor.

Referring now to FIG. 2, the appliance 10 is depicted in assembled relation with a linear body or cable 15. The illustrated cable 15 is a flexible, two-strand messenger cable of the so-called FIG.-8 type. In applying the appliance 10 to the cable 15, the longer pitch leg 11 is first wrapped in conventional fashion about the cable 15 in tightly encircling and gripping relation therewith. After the cable has been locked into the longer pitch leg 11, the helically preformed leg 12 is now applied about both cable 15 and the leg 11 in a tightly encircling relation in the manner illustrated.

It has been found that a secure frictional gripping of the cable 15 is obtained by the combined action of the two helical legs. Specifically, it has been found that the longer pitch leg 11 is rather easily installed about the non-circular and highly flexible cable 15 to provide a body of a relatively uniform and more rigid contour for the helices of the leg 12 grip. The short pitch leg 12 also serves to clamp the surface of the longer pitch leg 11 in tightly gripping relation with the cable 15. The present structure also obviates excessive localized radial pressures that might be encountered with conventional dead-end structures.

Figure 3:
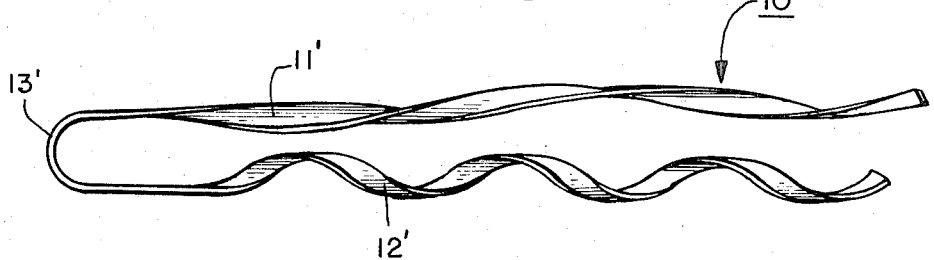
FIG. 3 is a side elevational view of a presently preferred construction of the invention wherein the helical legs are of an opposite hand of lay.
Figure 4:
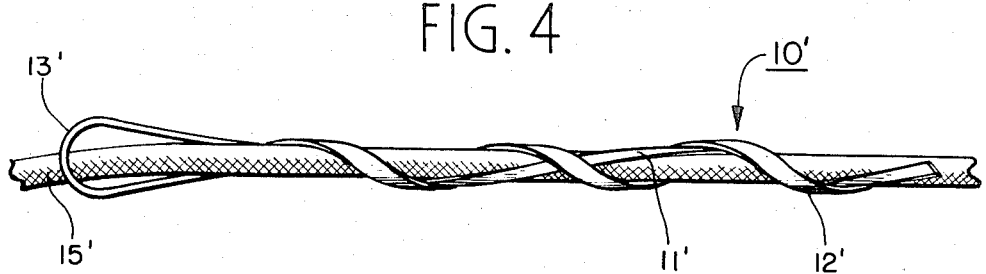
FIG. 4 illustrates the appliance of FIG. 3 as applied to a cable.

A modified, and in fact preferred, form of the invention is illustrated in FIG. 3. The embodiment of FIG. 3 is identical to that of FIG. 1 excepting that the helical legs 11' and 12' are of an opposite hand of lay, i.e., the helices spiral in opposite directions. It has been found from actual tests that a greater holding power with a lesser probability of damage to the linear body 15' results from the legs being of an opposite pitch as illustrated. As with the embodiment of FIG. 1, the ratio of the pitch of the two legs may vary widely according to the contemplated environment of use. However, the difference in pitch between the legs should be such as to assure that the shorter pitch leg crosses over and grips the longer pitch leg several times over the length of the appliance. The appliance 10' is illustrated as applied to the cable 15' in FIG. 4. The method of installation is again the same as that previously described in connection with the first embodiment.

Manufacture of the disclosed appliances 10 and 10' is facilitated by forming each of the legs and the bight portion separately and then joining the three elements by welding, clamping or the like. Specifically, the single element repetitive helical leg structures of each appliance are well suited to continuous forming processes, the resultant continuous strips of helical material being cut at periodic intervals to define the individual appliance legs. The appliance bight portions are also well suited for manufacture by continuous forming techniques. Specifically, a continuous and nominally straight strip of material is return bent and is then cut at appropriate intervals to form the appliance bight. Integral assembly of the three appliance components in the manner aforesaid is also easily effected by known automation techniques.

While particular embodiments of the present invention have been shown and described, it is apparent that various changes and modifications may be made, and it is therefore intended in the following claims to cover all such modifications and changes as may fall within the true spirit and scope of this invention.

I claim:

1. A method of manufacturing helical appliances of a type comprising a pair of helically preformed leg portions and a U-shaped bight portion joining said leg portions, comprising the steps of:
   forming continuous strips of resilient material into continuous helical strips of predetermined internal diameter and pitch length;
   cutting said continuous helical strips at periodic intervals corresponding to the desired length of said helical legs;
   forming continuous strips of resilient material into continuous generally sine wave type undulations, each individual undulation corresponding to the desired configuration of the bight portions of said appliances;
   cutting said continuous undulating strips between each undulation to define generally U-shaped appliance bight portions; and
   integrally joining one of said helical legs to each end of each of said bight portions to form said helical appliances.

2. The method of claim 1 in which said forming step comprises independently forming two continuous strips of resilient material into continuous helical strips of different pitch length, said cutting step comprises cutting each of said two strips at respective preselected intervals to form pairs of helical legs of different pitch length and integrally joining said pairs of helical legs to respective bight portions to form helical appliances having leg portions of different pitch lengths.

* * * * *